(12) United States Patent
Taylor

(10) Patent No.: US 10,862,213 B1
(45) Date of Patent: Dec. 8, 2020

(54) OMNIDIRECTIONAL QUAD-LOOP ANTENNA FOR ENHANCING WI-FI SIGNALS

(71) Applicant: William Taylor, Yuma, AZ (US)

(72) Inventor: William Taylor, Yuma, AZ (US)

(*) Notice: Subject to any disclaimer, the term of this patent is extended or adjusted under 35 U.S.C. 154(b) by 0 days.

(21) Appl. No.: 16/557,441

(22) Filed: Aug. 30, 2019

(51) Int. Cl.
| | | |
|---|---|---|
| *H01Q 7/00* | (2006.01) | |
| *H01Q 1/22* | (2006.01) | |
| *H04W 88/08* | (2009.01) | |
| *H01Q 1/36* | (2006.01) | |
| *H01Q 9/40* | (2006.01) | |

(52) U.S. Cl.
CPC ............ *H01Q 7/00* (2013.01); *H01Q 1/2291* (2013.01); *H01Q 1/362* (2013.01); *H01Q 9/40* (2013.01); *H04W 88/08* (2013.01)

(58) Field of Classification Search
CPC ........ H01Q 7/00; H01Q 1/362; H01Q 1/2291; H01Q 9/40; H04W 88/08
See application file for complete search history.

(56) References Cited

U.S. PATENT DOCUMENTS

| | | | | |
|---|---|---|---|---|
| 2,732,551 | A * | 1/1956 | Kraus .................... | H01Q 9/40 343/843 |
| 4,397,041 | A * | 8/1983 | Takeda .................. | H01Q 5/40 343/742 |
| 6,211,846 | B1 * | 4/2001 | Gouin ................... | H01Q 7/00 343/726 |
| 8,179,330 | B2 * | 5/2012 | Waltho .................. | H01Q 9/40 343/742 |
| 8,836,595 | B2 * | 9/2014 | Hanazawa ............ | H01Q 21/28 343/734 |
| 2007/0091005 | A1 * | 4/2007 | Tsui ...................... | H01Q 11/12 343/742 |
| 2007/0254587 | A1 * | 11/2007 | Schadler ............... | H01Q 21/24 455/13.3 |
| 2008/0316128 | A1 * | 12/2008 | Apostolos ............. | H01Q 7/00 343/742 |
| 2009/0146902 | A1 * | 6/2009 | Li ......................... | H01Q 21/061 343/867 |
| 2010/0283689 | A1 * | 11/2010 | Waltho .................. | H01Q 9/40 343/702 |
| 2011/0109169 | A1 * | 5/2011 | Shimamoto ......... | G06K 7/10316 307/104 |

(Continued)

FOREIGN PATENT DOCUMENTS

WO WO-2020060536 A1 * 3/2020 ............. H01Q 9/265

*Primary Examiner* — Raymond R Chai
(74) *Attorney, Agent, or Firm* — Schmeiser, Olsen & Watts LLP

(57) ABSTRACT

An omnidirectional quad-loop antenna has four open circular wire loops, each being the same length as the wavelength of a Wi-Fi signal. The loops are joined at their tops and each lies in a distinct plane that is rotated 45 degrees with respect to each adjoining wire loop. The bottom terminal ends of the loops are configured to connect to the outer conductor of a coaxial cable. A helical wire coil may be connected at one end to the loops at the connection point, or insulated from the loops, and the other end is configured to connect to the inner conductor of the cable. With the antenna and cable connected to a router, the Wi-Fi signal is much stronger, in any direction, than without. The compact antenna fits within the volume of a sphere with a circumference corresponding to the wavelength.

14 Claims, 7 Drawing Sheets

(56) References Cited

U.S. PATENT DOCUMENTS

| | | | |
|---|---|---|---|
| 2015/0295323 A1* | 10/2015 | Garcia | H01Q 21/20 |
| | | | 343/732 |
| 2017/0058130 A1* | 3/2017 | Addleman | B05D 1/12 |
| 2018/0123238 A1* | 5/2018 | Fenn | G01S 3/30 |
| 2018/0205157 A1* | 7/2018 | Sasaki | H01Q 21/06 |
| 2019/0058253 A1* | 2/2019 | Sasaki | H04B 5/0081 |
| 2020/0264220 A1* | 8/2020 | Lavedas | G01R 29/0878 |

* cited by examiner

US 10,862,213 B1

OMNIDIRECTIONAL QUAD-LOOP ANTENNA FOR ENHANCING WI-FI SIGNALS

BACKGROUND OF THE INVENTION

Technical Field

This invention relates generally to a Wi-Fi antenna, and more particularly to an omnidirectional quad-loop antenna for enhancing Wi-Fi signals.

State of the Art

Most homes and businesses now have some sort of network for computing devices to access the internet. One very common type of network is a wireless network. One common type of wireless network is a Wi-Fi network. Computers equipped with wireless cards or embedded wireless antennas can communicate without the need for any additional hardware. This allows users of the computing devices to access the Internet through the wireless network virtually anywhere in home or office.

However, wireless networks are not without challenges. For example, the most widely used wireless Ethernet networks operate around 2.4 GHz range. It is the frequency band that is used for many other applications, including satellites, baby monitors, garage-door openers, microwave ovens, Bluetooth networks, and high-end wireless phones. Such a wide range of applications creates interference and increases the noise level on wireless networks.

More importantly, wireless networks operate on radio frequencies. Heavy walls, metal meshes sandwiched inside walls and large metal objects, such as bookshelves and file cabinets, all interfere with radio signals. It is not uncommon for a portable computer to have a relatively stable connection if it is close to an access point but have problematic intermittent connection if it is used in a different room than the room having the access point. This may cause frustration to the user of the portable computer who is attempting to use the wireless network. Even existing Wi-Fi enhancer antennas have limitations in their abilities to provide enough signal enhancement. In addition, some conventional Wi-Fi enhancer antennas are unidirectional, and many are large and obtrusive.

Accordingly, there is a need for an improved antenna for enhancing Wi-Fi signals.

SUMMARY OF THE INVENTION

The present invention relates to a Wi-Fi antenna, and more particularly to an omnidirectional quad-loop antenna for enhancing Wi-Fi signals.

Embodiments of an omnidirectional quad-loop antenna may comprise four open circular wire loops. The length of each wire loop is approximately the same as the wavelength of a particular Wi-Fi signal.

Each of the four wire loops is disposed symmetrically about a coplanar central axis extending through a center point thereof. All of the four wire loops are coupled together at their center points, such that all four wire loops are contained within a volume of a sphere having the same circumference as one of the four wire loops. The central axes of all of the four wire loops are colinear. Each of the four wire loops lies in a distinct plane that is rotated 45 degrees about the central axis with respect to each adjoining wire loop.

It is an advantage of the present invention that the entire omnidirectional quad-loop antenna is contained within the volume of a sphere having a circumference approximately equal to the wavelength of the Wi-Fi signal intended to be enhanced. It is a further advantage of the present invention that the enhanced radiation pattern is omnidirectional.

Embodiments of an omnidirectional quad-loop antenna may further comprise a helical wire coil. The length of the helical wire coil corresponds to the preset tuning length, wherein the length of the helical wire coil is the same as the lengths of each of the four wire loops. In embodiments, a central longitudinal axis of the helical wire coil is colinear with the central axes of the four wire loops. The first end of the helical wire coil is coupled to the center points of all of the four wire loops.

In alternative embodiments, an insulator is coupled between the first end of the helical wire coil and the four wire loops.

Some embodiments may comprise more than four open circular wire loops evenly rotated about a central axis.

An omnidirectional quad-loop antenna, of the present invention, may be configured to be coupled to a dual-conductor wire or cable, such as a coaxial cable, for example, that is connected to a Wi-Fi signal generator, such as a router.

A Wi-Fi signal emanating from a router having an omnidirectional quad-loop antenna coupled thereto is much stronger than a router not having an omnidirectional quad-loop antenna coupled thereto. Furthermore, the signal is strong in any direction from the Wi-Fi router.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a Wi-Fi antenna, and more particularly to an omnidirectional quad-loop antenna for enhancing Wi-Fi signals.

Figure 1:
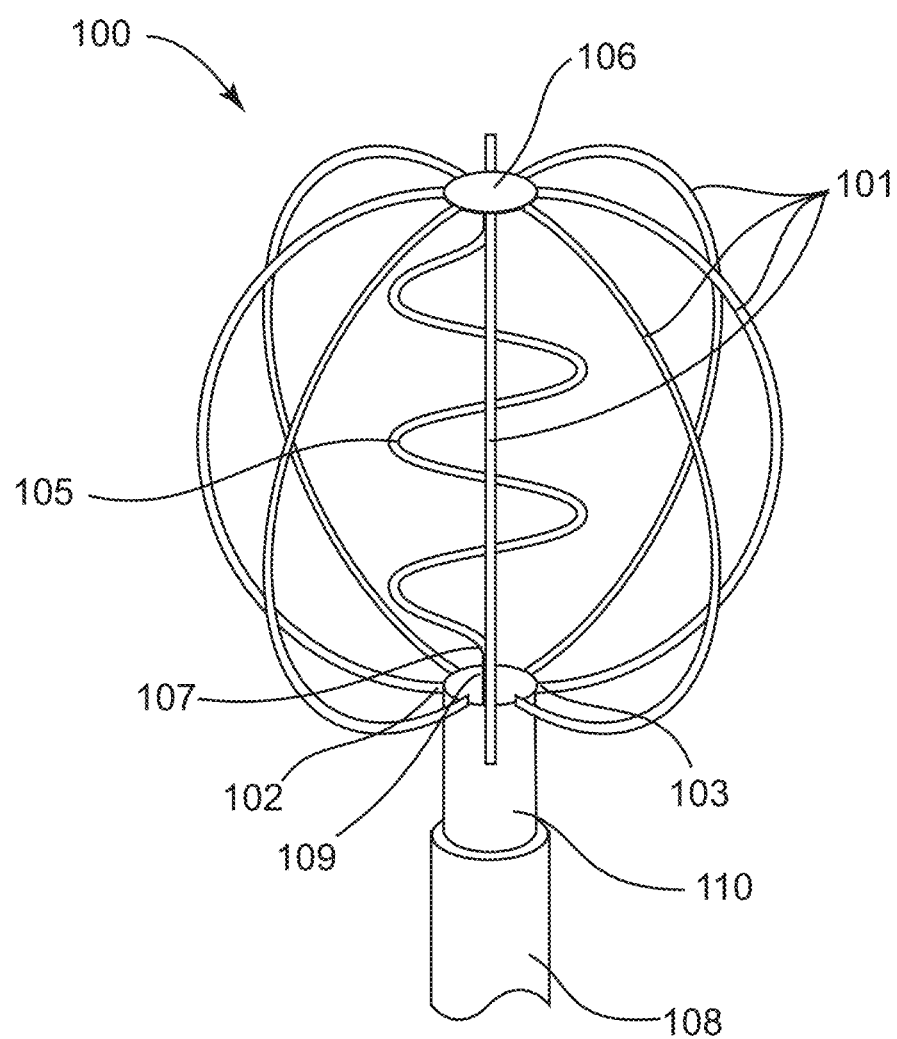
FIG. 1 is a perspective view of an omnidirectional quad-loop antenna, according to an embodiment.

Referring to the drawings, FIG. 1 is a perspective view of an omnidirectional quad-loop antenna 100, of the present invention. Embodiments of an omnidirectional quad-loop antenna 100 may comprise four open circular wire loops 101. A single open circular wire loop 101 is shown in more detail in FIG. 2. Each of the four wire loops 101 has a first end 102, a second end 103, and a center point 104 midway between the first end 102 and the second end 103. The length of each wire loop 101, as measured from the first end 102 to the second end 103, corresponds to a preset tuning length, which is approximately the same as the wavelength of a particular Wi-Fi signal. For example, 2.4 GHz Wi-Fi signal has a wavelength of approximately 122 mm. Thus, in embodiments intended for use as a 2.4 GHz Wi-Fi signal booster, the length of each of the four open circular wire loops 101 is approximately 122 mm. However, this is not intended to be limiting. The length of each of the four open circular wire loops 101 may be of a different length corresponding to the wavelength of a Wi-Fi signal of a different frequency.

The most widely used frequency for Wi-Fi transmissions is 2.4 GHz. Other commonly used frequencies include 3.6 GHz, corresponding to a wavelength of approximately 83 mm, 4.9 GHz, corresponding to a wavelength of approximately 61 mm, 5 GHz, corresponding to a wavelength of approximately 60 mm, and 5.9 GHz, corresponding to a wavelength of approximately 51 mm. Thus, in other embodiments, the length of each of the four open circular wire loops 101 may be any length corresponding to the wavelength of a Wi-Fi signal having any commonly used frequency, or any other length, corresponding to any other Wi-Fi signal having a different frequency. In any case, the lengths of all of the four wire loops 101 of any particular embodiment are substantially equal.

Figure 2:
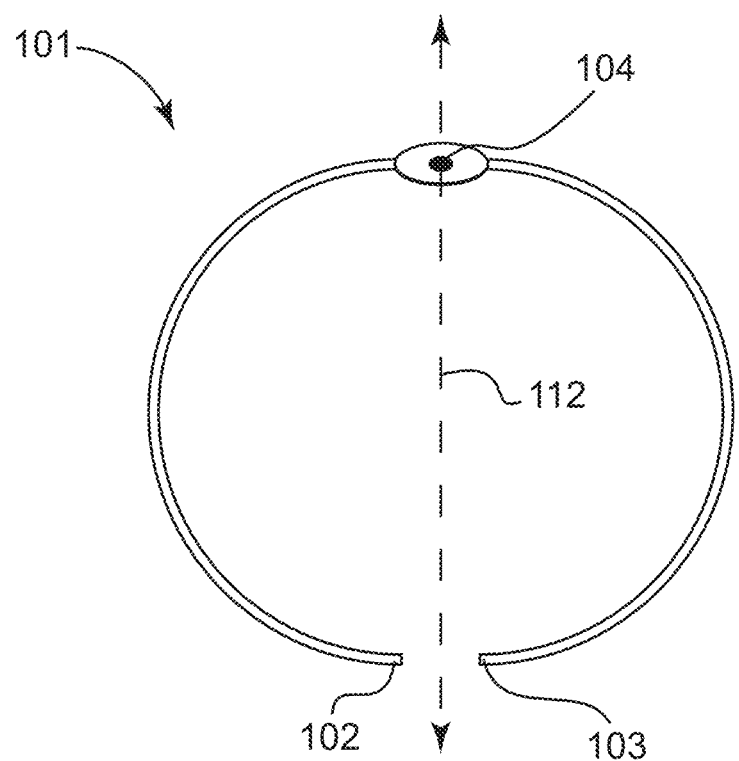
FIG. 2 is an open circular wire loop of an omnidirectional quad-loop antenna, according to an embodiment.
Figure 5:
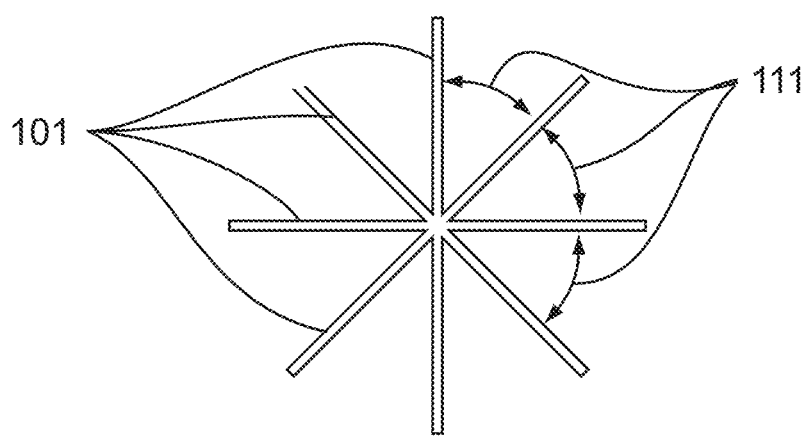
FIG. 5 is a top view of the wire loops of an omnidirectional quad-loop antenna, according to an embodiment.

Each of the four wire loops 101 is disposed symmetrically about a coplanar central axis 112 extending through the center point 104, as shown in FIG. 2. Furthermore, in embodiments of the present invention, all of the four wire loops 101 are coupled together at their center points 104, such that all four wire loops 101 are contained within a volume of a sphere having the same circumference as one of the four wire loops 101, as shown in FIG. 1. Thus disposed, the central axes 112 of all of the four wire loops 101 are colinear. Each of the four wire loops 101 lies in a distinct plane that is rotated 45 degrees about the central axis 112 with respect to each adjoining wire loop 101. This disposition is shown in further detail in FIG. 5, which is a top view of the four wire loops 101, showing the angles 111 between the planes of the wire loops 101.

It is an advantage of preferred embodiments of the present invention that the entire omnidirectional quad-loop antenna 100 is contained within the volume of a sphere having a circumference approximately equal to the wavelength of the Wi-Fi signal intended to be enhanced thereby.

It is a further advantage of preferred embodiments of the present invention that the enhanced radiation pattern emitted therefrom is omnidirectional. Conventional loop antennas have a dipole radiation pattern. Their signals are most strongly broadcast in two broad lobes in opposite directions perpendicular the plane of the loop. Because the planes of the respective four wire loops are rotated evenly about their central axes, the omnidirectional quad-loop antenna of the present invention broadcasts a relatively strong signal in any direction radiating from the central axes of the wire loops.

Figure 4:
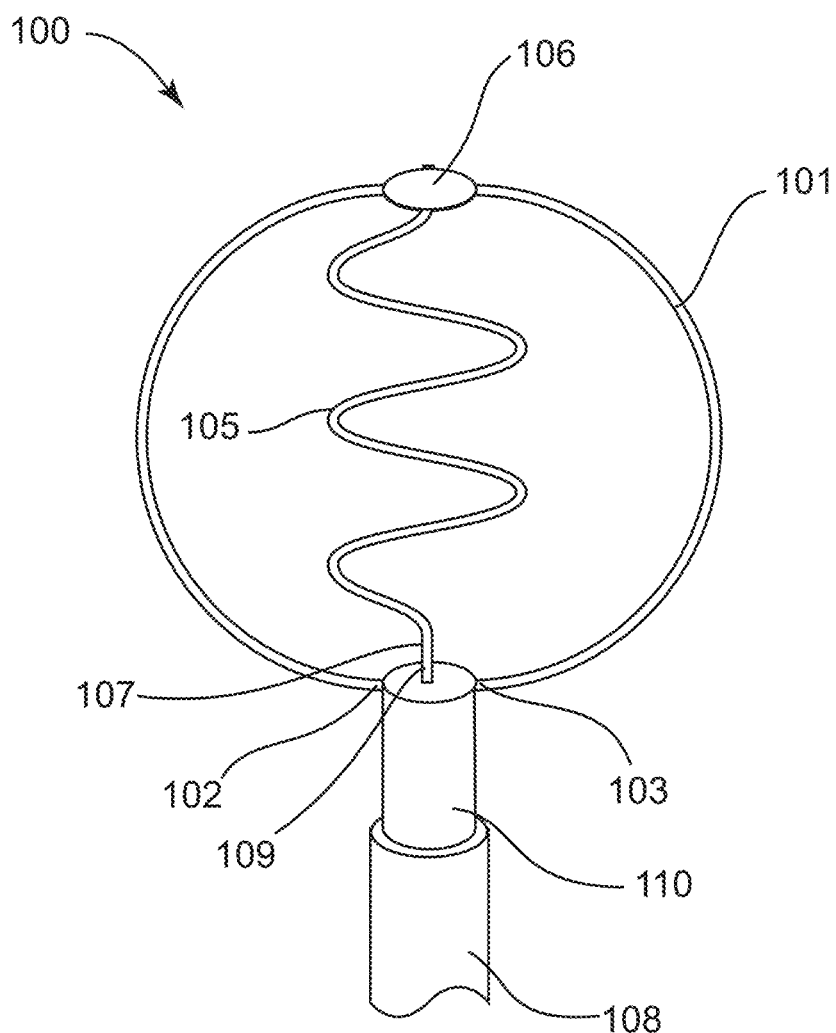
FIG. 4 is a perspective view of an omnidirectional quad-loop antenna, having all but one open circular wire loop removed for clarity, the antenna being coupled to a coaxial cable, according to an embodiment.

The first and second ends 102 and 103 of all of the four wire loops 101 may be configured to be coupled to an outer conductor 110 of a coaxial cable 108, as shown in FIG. 1. FIG. 4 shows a single wire loop 101, the first and second ends 102 and 103 of which are coupled to the outer conductor 110 of a coaxial cable 108.

Figure 3:
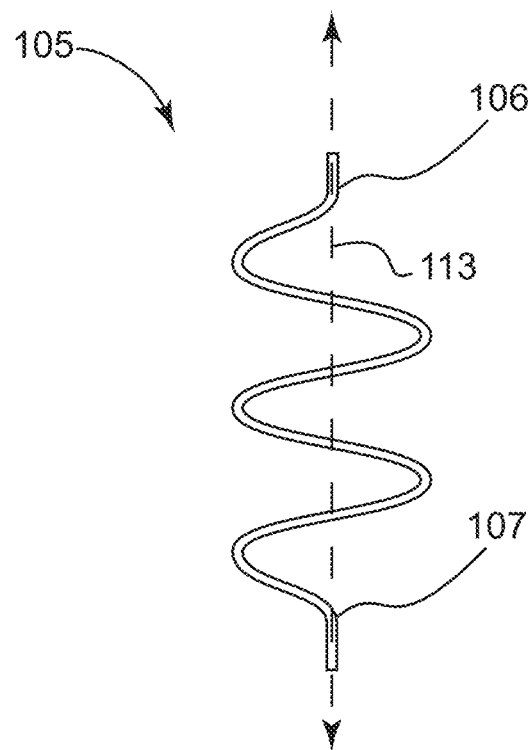
FIG. 3 is a helical wire coil of an omnidirectional quad-loop antenna, according to an embodiment.

Embodiments of an omnidirectional quad-loop antenna 100 may further comprise a helical wire coil 105. As shown in FIG. 3, a helical wire coil 105 may comprise a top end 106 and an opposed bottom end 107. The length of the helical wire coil 105 corresponds to the preset tuning length, wherein the length of the helical wire coil 105 is the same as the lengths of each of the four wire loops 101. A longitudinal axis 113 extends through the top and bottom ends 106 and 107 thereof. In embodiments, the longitudinal axis 113 of the helical wire coil 105 is colinear with the central axes 112 of the four wire loops 101. The top end 106 of the helical wire coil 105 is coupled to the center points 104 of all of the four wire loops 101 and the bottom end 107 of the helical wire coil 105 may be configured to be coupled to the inner conductor 109 of a coaxial cable 108, as shown in FIGS. 1 and 4.

Although an omnidirectional quad-loop antenna 100, as described herein, comprises four open circular wire loops 101, this is not intended to be limiting. An omnidirectional quad-loop antenna 100, of the present invention, may comprise more than four open circular wire loops 101, provided that each of the more than four open wire loops lies 101 in a distinct plane, wherein all of the planes are rotated evenly in an array about the central axes 112 thereof. Thus, the angles 111 between each plane and each adjoining plane are all the same.

In embodiments, the coaxial cable 108, to which an omnidirectional quad-loop antenna 100 may be coupled, is configured to connect to a Wi-Fi signal generator, such as a Wi-Fi router, for example. Although an omnidirectional quad-loop antenna 100 may be coupled to a coaxial cable 108, as described herein, this is not intended to be limiting. An omnidirectional quad-loop antenna 100 may be coupled to any other suitable wire or cable having two conductors.

In preferred embodiments, each of the open circular wire loops 101 and the helical wire coil 105 is made of copper. However, this is not intended to be limiting. Each of the open circular wire loops 101 and the helical wire coil 105 may be made of any other suitable conductive material.

Figure 7:
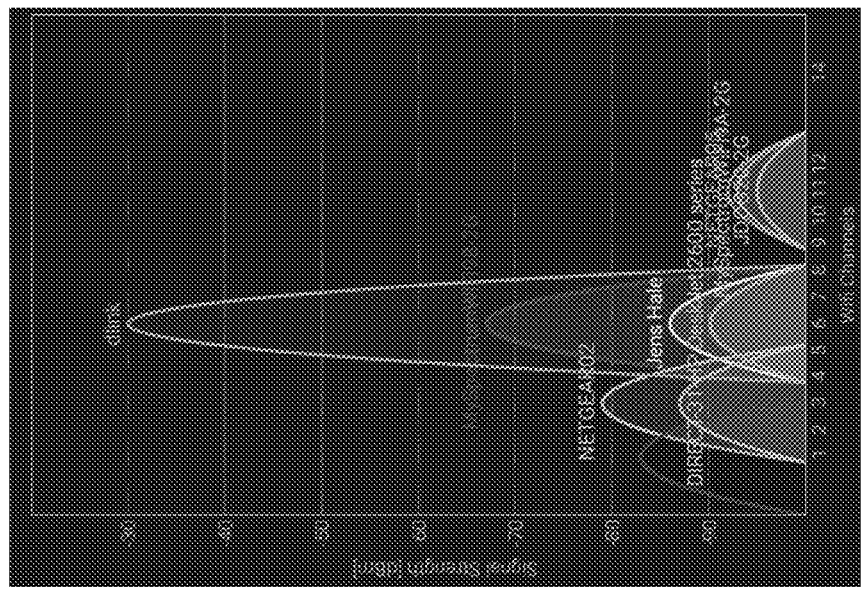
FIG. 7 is a chart showing the Wi-Fi signal strength of a representative Wi-Fi signal emanating from a Wi-Fi router with an omnidirectional quad-loop antenna connected thereto.
Figure 6:
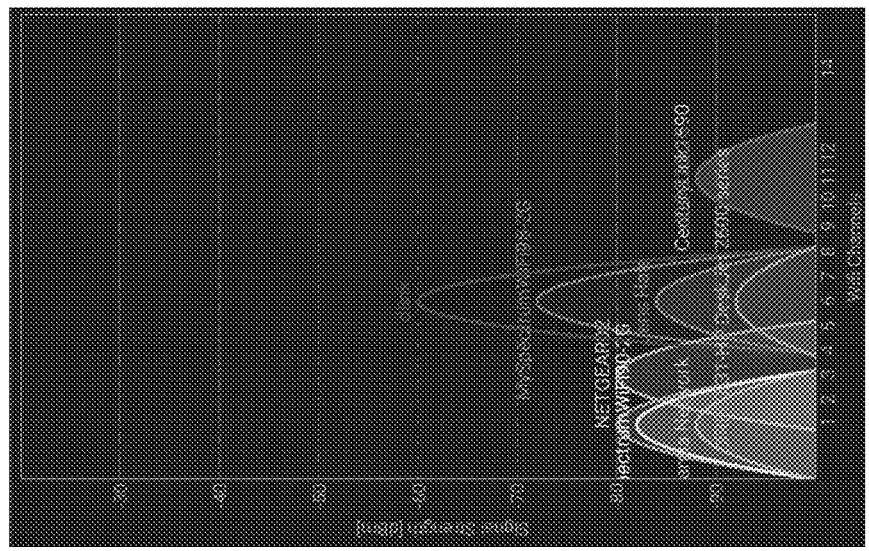
FIG. 6 is a chart showing the Wi-Fi signal strength of a representative Wi-Fi signal emanating from a Wi-Fi router without an omnidirectional quad-loop antenna connected thereto.

Referring to the drawings, FIG. 6 depicts a graph indicating the strength of a representative Wi-Fi signal emanating from a Wi-Fi router without an omnidirectional quad-loop antenna 100 coupled thereto. FIG. 7 depicts a graph indicating the strength of a representative Wi-Fi signal emanating from a Wi-Fi router with an omnidirectional quad-loop antenna 100 coupled thereto. As can be seen from a comparison of the two graphs in FIGS. 6 and 7, the Wi-Fi signal emanating from the Wi-Fi router having an omnidirectional quad-loop antenna 100 coupled thereto is much stronger than the one without an omnidirectional quad-loop antenna 100 coupled thereto.

Figure 8:
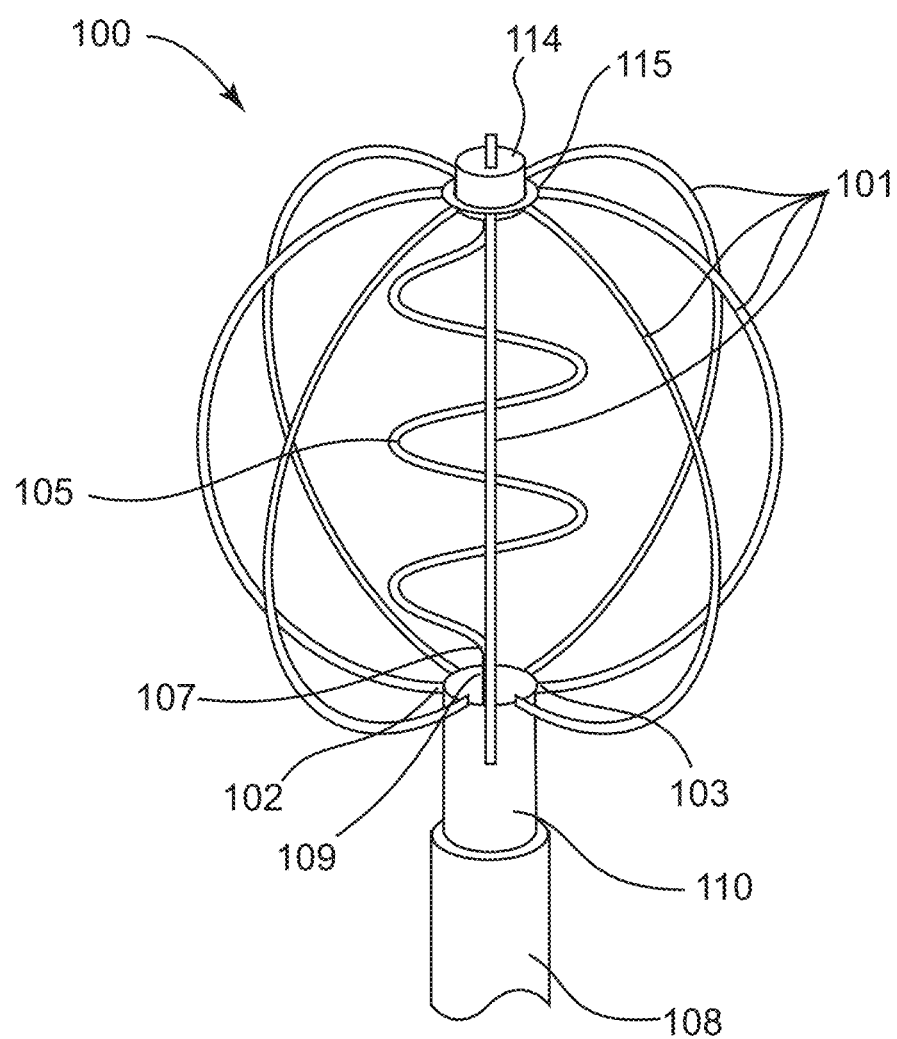
FIG. 8 is a perspective view of an omnidirectional quad-loop antenna, according to an alternative embodiment.

In an alternative embodiment of an omnidirectional quad-loop antenna 120, as shown in FIG. 8, the first end 106 of the coil 105 is insulated from the four open circular wire loops 101 by insulator 114. Insulator 114 may be made of any suitable insulative material. In this alternative embodiment, each of the four open circular wire loops 101 is coupled to a connecting circular wire 115, wherein the insulator 114 is coupled between the connecting circular wire 115 and the first end 106 of the coil 105.

Figure 9:
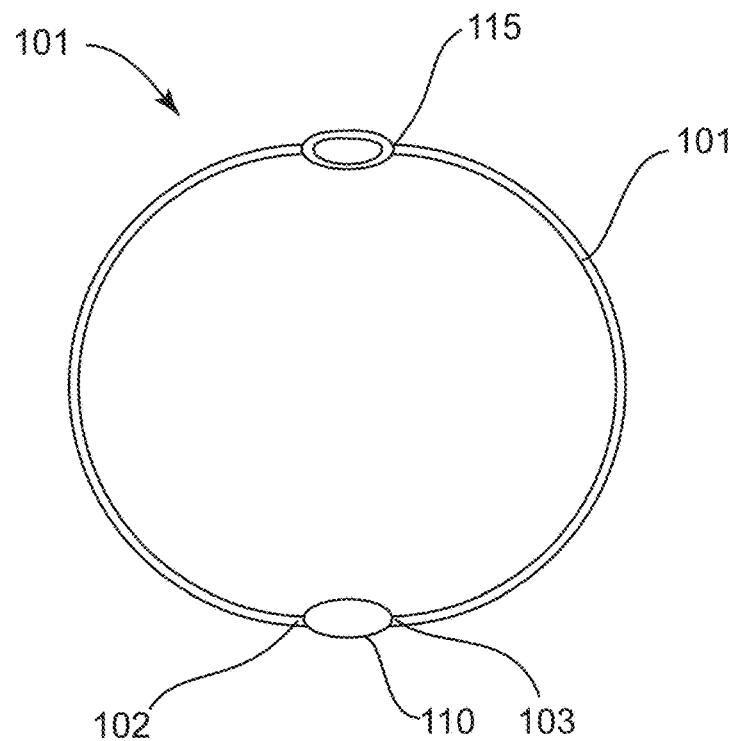
FIG. 9 is an open circular wire loop of an omnidirectional quad-loop antenna, according to an alternative embodiment.
Figure 10:
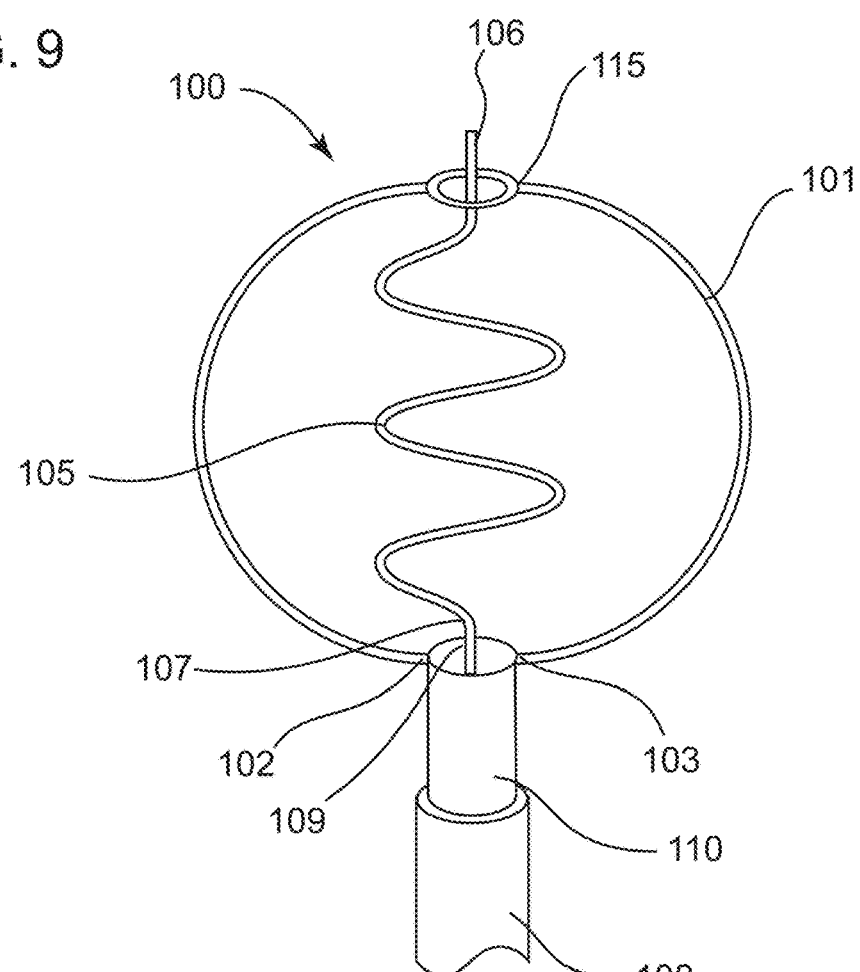
FIG. 10 is a perspective view of an omnidirectional quad-loop antenna, having all but one open circular wire loop removed for clarity, the antenna being coupled to a coaxial cable, according to an alternative embodiment.

For clarity, FIGS. 9 and 10 show a single open circular wire loop 101 coupled to connecting circular wire 115 and to the outer conductor 110 of coaxial cable 108. FIG. 10 particularly shows the disposition of coil 105 relative to the four circular wire loops 101 as represented by one of the four circular wire loops 101, with insulator 114 removed for clarity.

Figure 11:
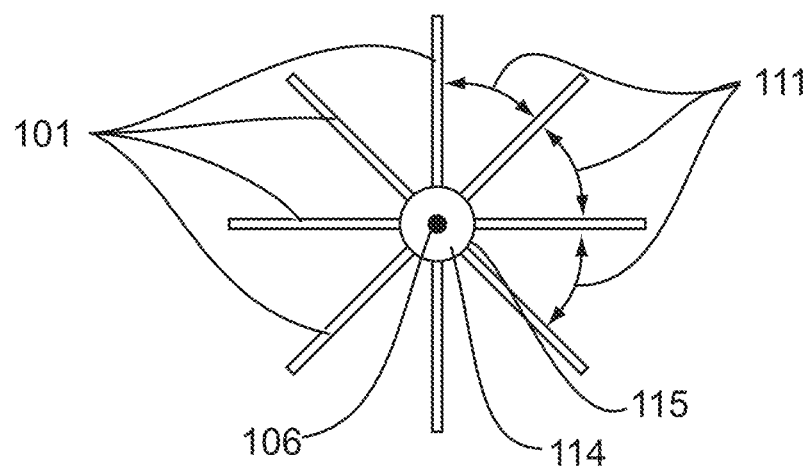
FIG. 11 is a top view of the wire loops of an omnidirectional quad-loop antenna, according to an alternative embodiment.

FIG. 11 is a top view of the alternative embodiment of an omnidirectional quad-loop antenna 120, as described above. As illustrated, the first end 106 of coil 105 is visible within the connecting circular wire 115, with insulator 114 being coupled between the first end 106 and the connecting circular wire 115.

Figure 12:
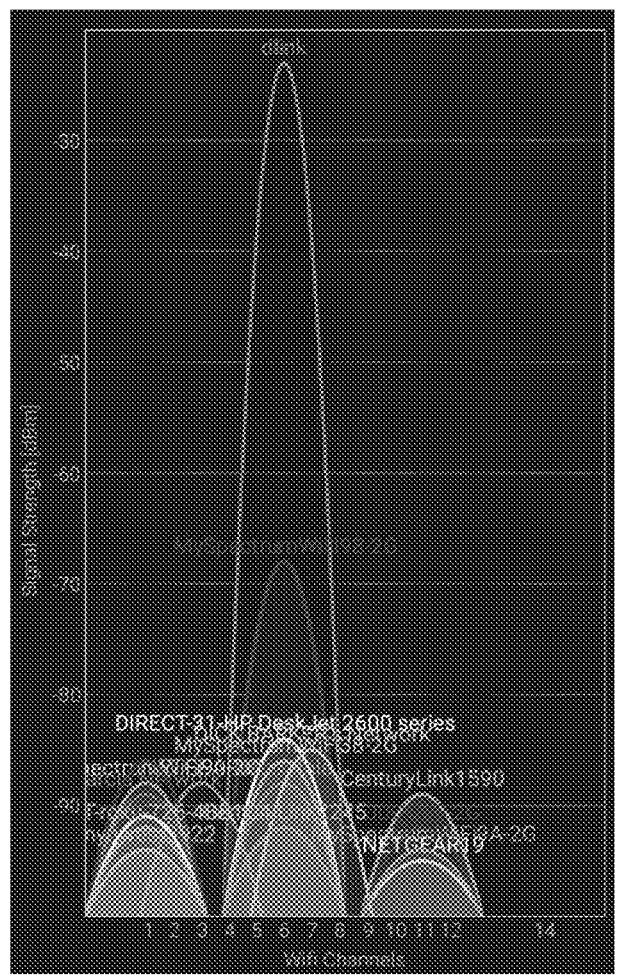
FIG. 12 is a chart showing the Wi-Fi signal strength of a representative Wi-Fi signal emanating from a Wi-Fi router with an alternative embodiment of an omnidirectional quad-loop antenna connected thereto.

FIG. 12 depicts a graph illustrating the strength of a representative Wi-Fi signal emanating from a Wi-Fi router with an omnidirectional quad-loop antenna 120 coupled thereto. As can be seen from a comparison of the two graphs in FIGS. 6 and 12, the Wi-Fi signal emanating from the Wi-Fi router having an omnidirectional quad-loop antenna 120 coupled thereto is much stronger than the one without an omnidirectional quad-loop antenna 120 coupled thereto.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An omnidirectional antenna comprising:
    at least four open circular wire loops, each of the at least four wire loops having a circumference corresponding to the wavelength of a predetermined Wi-Fi signal, wherein all of the at least four wire loops are contained within a spherical volume having a circumference that corresponds to the circumference of each of the at least four wire loops, wherein each of the at least four wire loops further comprises:
        a first end configured to be coupled to a first conductive member of a two-conductor cable;
        a second end configured to be coupled to the first conductive member of the two-conductor cable; and
        a center point midway between the first end and the second end, the center point being configured to be coupled to a second conductive member of the two-conductor cable, wherein the center points of all of the at least four wire loops are coupled together, wherein a central axis extends perpendicularly through the center points of and is coplanar with each of the at least four wire loops, wherein each of the at least four wire loops lies in a distinct plane, wherein the at least four wire loops are rotated in an equally-distributed array about the central axis.

2. The omnidirectional antenna of claim 1, wherein the number of wire loops is four.

3. The omnidirectional antenna of claim 1, wherein the two-conductor cable is a coaxial cable.

4. The omnidirectional antenna of claim 1, wherein the circumference of the spherical volume is approximately 122 mm, corresponding to the wavelength of a 2.4 GHz Wi-Fi signal.

5. The omnidirectional antenna of claim 1, further comprising:
    a helical coil having opposed top and bottom ends, the helical coil being contained within the spherical volume and having a length corresponding to the circumference of the spherical volume, wherein a longitudinal axis extending through the top and bottom ends coincides with the central axis, wherein the top end is coupled to the center point of each of the at least four wire loops, and the bottom end is configured to be coupled to the second conductive member of the two-conductor cable.

6. The omnidirectional antenna of claim 5, wherein the number of wire loops is four.

7. The omnidirectional antenna of claim 5, wherein the two-conductor cable is a coaxial cable.

8. The omnidirectional antenna of claim 5, wherein the circumference of the spherical volume is approximately 122 mm, corresponding to the wavelength of a 2.4 GHz Wi-Fi signal.

9. An omnidirectional antenna comprising:
    four open circular wire loops, each of the four wire loops having a circumference corresponding to the wavelength of a predetermined Wi-Fi signal, wherein all of the four wire loops are contained within a spherical volume having a circumference that corresponds to the circumference of each of the four wire loops, wherein each of the four wire loops further comprises:
        a first end coupled to a first conductive member of a two-conductor cable;
        a second end coupled to the first conductive member of the two-conductor cable; and
        a center point midway between the first end and the second end, wherein the center points of all of the four wire loops are coupled together, wherein a central axis extends perpendicularly through the center points of and is coplanar with each of the four wire loops, wherein each of the four wire loops lies in a distinct plane rotated 45 degrees about the central axis from each adjoining wire loop of the four wire loops, respectively; and
    a helical coil having opposed top and bottom ends, the helical coil being contained within the spherical volume and having a length corresponding to the circumference of the spherical volume, wherein a longitudinal axis extending through the top and bottom ends coincides with the central axis, wherein the top end is coupled to the center point of each of the four wire loops, and the bottom end is coupled to the second conductive member of the two-conductor cable, wherein the two-conductor cable is configured to be connected to a Wi-Fi signal output port of a Wi-Fi router.

10. The omnidirectional antenna of claim 9, wherein the two-conductor cable is a coaxial cable.

11. The omnidirectional antenna of claim 9, wherein the circumference of the spherical volume is approximately 122 mm, corresponding to the wavelength of a 2.4 GHz Wi-Fi signal.

12. An omnidirectional antenna comprising:
four open circular wire loops, each of the four wire loops having a circumference corresponding to the wavelength of a predetermined Wi-Fi signal, wherein all of the four wire loops are contained within a spherical volume having a circumference that corresponds to the circumference of each of the four wire loops, wherein each of the four wire loops further comprises:
   a first end coupled to a first conductive member of a two-conductor cable;
   a second end coupled to the first conductive member of the two-conductor cable; and
   a center point midway between the first end and the second end, wherein the center points of all of the four wire loops are coupled together by a connecting circular wire, wherein a central axis extends perpendicularly through the connecting circular wire and is coplanar with each of the four wire loops, wherein each of the four wire loops lies in a distinct plane rotated 45 degrees about the central axis from each adjoining wire loop of the four wire loops, respectively;
a helical coil having opposed top and bottom ends, the helical coil being contained within the spherical volume and having a length corresponding to the circumference of the spherical volume, wherein a longitudinal axis extending through the top and bottom ends coincides with the central axis, wherein the top end extends perpendicularly through the connecting circular wire, and the bottom end is coupled to the second conductive member of the two-conductor cable, wherein the two-conductor cable is configured to be connected to a Wi-Fi signal output port of a Wi-Fi router; and
an insulator coupled between the connecting circular wire and the top end of the helical coil.

13. The omnidirectional antenna of claim 12, wherein the two-conductor cable is a coaxial cable.

14. The omnidirectional antenna of claim 12, wherein the circumference of the spherical volume is approximately 122 mm, corresponding to the wavelength of a 2.4 GHz Wi-Fi signal.

* * * * *